Patented Nov. 12, 1940

2,220,988

UNITED STATES PATENT OFFICE 2,220,988

ADHESIVE OF THE REMOISTENING TYPE

Hans F. Bauer, Chicago, Jordan V. Bauer, Elmwood Park, and Don M. Hawley, Geneva, Ill., assignors to Stein, Hall Manufacturing Company, Chicago, Ill., a corporation of Delaware No Drawing. Application January 28, 1939,
Serial No. 253,344

13 Claims. (Cl. 134—23.4)

This invention relates to improvements in adhesive manufacture and more particularly to a new and improved type of amylaceous remoistening adhesive.

The present application is a continuation-in-part of our copending applications, Serial Nos. 224,110, filed August 10, 1938; 226,074, filed August 22, 1938; 235,480, filed October 17, 1938; and 247,138, filed December 22, 1938.

The term "amylaceous adhesive" is employed herein to refer to those types of adhesives which are prepared from starches and starch degradation products, such as dextrines or starch gums. The expression "remoistening adhesive" is employed to describe an adhesive which is applied to a material as a coating and dried, and which, on being moistened, will develop tackiness and act as a suitable adhesive for bonding the material to other materials.

At present, large amounts of gummed paper, suitable for such purposes as labels, stamps and envelope seals, are prepared with dextrine adhesives, but dextrine adhesives have never been successful in replacing animal glue adhesives in the field of gummed tape for sealing the heavier types of boxes or for gummed paper or fabric which is to be used for purposes wherein it is required that the adhesive coating on being moistened will develop rapidly strong adhesive properties and set up very rapidly to form a bond. In our applications previously referred to, we have described new and improved types of adhesives made from base materials of certain specified characteristics, intimately dispersed or associated with certain auxiliary materials. We have also described new and improved types of gummed tapes made from such adhesives.

These adhesives afford many improvements and advantages over the animal glue type of adhesive and possess remoistening adhesive properties which are superior to most of the animal glue adhesives now in use. They can be employed in those uses where heretofore only gummed tape made from animal glue or fish glue remoistening adhesives could be satisfactorily used.

In carrying out the inventions described in the aforesaid patent applications, we have stressed particularly the use of urea or of a water soluble urea, in conjunction with the starchier types of amylaceous conversion products, the urea acting as a plasticizing agent and at the same time counteracting the retrogradation of incompletely degraded portions of the amylaceous base material to a less soluble form.

One of the objects of this invention is to provide new and improved types of remoistening adhesives, characterized by exceptional adhesive strength and suitable for the strongest type of remoistening applications. Other objects will appear hereinafter.

In accordance with this invention it has been found that water soluble thiocyanates, which have a solubilizing or dispersing action on starch degradation products, may be employed in amylaceous adhesive compositions made from the starchier types of amylaceous conversion products and are adapted to act as plasticizing agents and to counteract the retrogradation of incompletely degraded portions of the amylaceous material to a less soluble form.

We have found, in accordance with this invention, that by employing water soluble thiocyanates in the manner hereinafter more specifically disclosed we are able to prepare superior remoistening adhesives which develop extreme tackiness immediately upon being remoistened, do not tend to slip or slide on the surface to which they are applied even under conditions of considerable tension or sidewise pressure and have sufficient cohesiveness while still wet to hold surfaces together which would normally tend to spring apart.

Our base materials, for the purpose of this invention, comprise the starchier types of amylaceous conversion products which have been converted to the following characteristics:

(a) A dextrine content of less than 55%, as determined by the method of Babington, Tingle and Watson, Journal of the Society of Chemical Industry 37 (1918) 257. This method is as follows:

"The sample (1 grm.) is warmed in a 100 cc. graduated flask with 30 cc. of water until just gelatinized and cooled quickly; 50 cc. of a cold saturated barium hydroxide solution is next added (the flask being meanwhile shaken), followed by enough water to bring the total volume to 100 cc. The solution is filtered through a dry 15 cm. paper and an aliquot portion (50 cc.) of the filtrate pipetted into a platinum dish. After the addition of 2 drops of 1% phenolphthalein solution, N/1 hydrochloric acid is added cautiously till the neutral point is just passed. A faint pink color is then restored by the addition of two or three drops of the barium hydroxide solution. A weighed quantity (about 10 grms.) of sand is added and the dish is heated on a water bath. The sand should be stirred when almost dry to expose the maximum surface to the air, after which the dish is transferred to a well regulated oven and dried to constant weight at 120° C., below which temperature crystallized barium chloride is dehydrated. Dextrin gum being hygroscopic, precautions must be taken accordingly. The dish is now heated strongly, but not beyond the temperature necessary for the complete combustion of the organic matter. During ignition the sand should be well stirred at intervals to allow full exposure to the air. The dish and contents are then cooled and weighed. The difference in weight before and after ignition represents the dextrin gum in 50 cc. of filtrate, i. e., in half the weight of sample taken."

(b) The viscosity of degraded or dextrinized starches is a definite indication of the extent to which the starch has been dextrinized or degraded. A suitable conversion product for the purpose of this invention comprises a dextrinized or degraded starch which when cooked in the proportions of 1 part of conversion product to 1½ parts of water to 190° F. and then cooled to 125° F. gives a viscosity reading within the range of 15 seconds to 400 seconds, preferably within the range of 25 seconds to 150 seconds on a Stormer viscosity apparatus, the readings in question being the time for 100 revolutions of the viscosimeter cylinder using a 100 gram weight. The Stormer viscosimeter used gave a reading of 5.6 seconds with water at 125° F. and a reading of 2.4 seconds running free with the viscosimeter cup empty, these readings being the time required for 100 revolutions of the viscosimeter cylinder using a 100 gram weight.

(c) Within the limits given under (a) and (b) we preferably employ the following types of conversion products:

(1) British gums having a solubility greater than about 60%, preferably 70% to 95%, in water at 75° F., and (2) Incompletely dextrinized starches of the white dextrine type having a solubility in water from about 3% to about 50% at 75° F.

The term "British gum" is employed to refer to those types of starch degradation products that are formed by roasting or heating starch without, or at the most, with very small amounts of acid catalysts as differentiated from dextrines which are formed from starch by roasting or heating the starch with relatively large amounts of acid catalysts. For the purpose of this invention it is preferable to employ as the base material a British gum type of amylaceous conversion product, but it will be understood that any amylaceous material having the general characteristics given under (a) and (b) may be employed in conjunction with the auxiliary materials mentioned hereinafter under (d) for the purpose of making a remoistening adhesive according to this invention.

(d) The base material given under (a) and (b) is mixed with or dispersed with a water soluble thiocyanate, preferably with the influence of heat, the thiocyanate being employed in effective amounts to plasticize the composition and to counteract the retrogradation of the more incompletely degraded portions of the amylaceous base material to a less soluble form. Among the water soluble thiocyanates which may be employed are ammonium thiocyanate, sodium thiocyanate and potassium thiocyanate. As previously indicated, the thiocyanates in addition to having a solvent action on starch conversion products apparently act as plasticizing agents, tending to inhibit the formation of checks or cracks, and they may be used either alone or in conjunction with other materials having a similar solvent and plasticizing action, as for example, water soluble ureas, including urea and thiourea and/or water soluble nitrates, including potassium nitrate, sodium nitrate, calcium nitrate and guanidine nitrate, with or without additional plasticizing agents, as, for example, glycerine, ethylene glycol, diethylene glycol and other polyhydric alcohols, or with sodium lactate and other substances having a plasticizing effect although not necessarily having a solvent effect on starch conversion products. In general it is preferable to employ about 3% to about 30% of a water soluble thiocyanate, with or without about 1% to about 10% of a plasticizer, such as glycerine, polyhydric alcohols or other normally liquid plasticizers.

(e) In addition to the foregoing auxiliary materials a relatively small amount of a viscosity increasing agent for amylaceous dispersions may be employed to improve the result obtained. A preferred agent for this purpose is borax. Sodium aluminate and similar soluble aluminates function somewhat similarly to borax in increasing the viscosity of amylaceous dispersions. The viscosity increasing agent may also be formed in situ in the adhesive composition, for example, by incorporating boric acid in the adhesive and adding an alkali in the remoistening water or some other compound adapted to react with boric acid to form a soluble borate.

The amount of borax or other viscosity increasing agent is preferably less than about 5% (e. g. about 1% to about 5%) and preferably not gerater than the amount of plasticizer. Where borax is employed in the compositions of this invention, it is preferable to employ a plasticizer having a modifying action on borax. Without such a plasticizer borax has an insolubilizing action on the starchier types of conversion products used as base materials which tends to destroy the retack properties.

It may be observed that the water soluble thiocyanates apparently have a modifying action on borax, which inhibits the insolubilizing action of the borax on the amylaceous conversion products. Hence, according to this invention, remoistening adhesives may be prepared from base materials having the general characteristics given under (a) and (b), together with borax and a solvent-plasticizing agent such as a water soluble thiocyanate, which is normally solid, with or without a plasticizing agent such as glycerine, which is normally liquid.

By the use of the specifically defined combination of materials herein disclosed, remoistening adhesives may be produced which are at least equivalent in adhesive properties to the better grades of animal glue remoistening adhesives. Additionally, it has been found that by the introduction of borax or other viscosity increasing agent into the water used to remoisten the adhesive film, it is possible to obtain adhesive results far superior to animal glue remoistening adhesives.

The following examples in which the quantities are stated in parts by weight will illustrate several of the preferred adhesive formulae of this invention and a comparison of their adhesive properties with other types of remoistening adhesives, as indicated by a McLaurin Gummed Tape Tester, which is an instrument made by the Thwing-Albert Instrument Company, Philadelphia, Pennsylvania, U. S. A. It will be understood that the results of these tests may vary somewhat depending upon humidity and temperature conditions, but the comparative results definitely showed the superiority of adhesives made in accordance with this invention.

Example I

| | Parts |
|---|---|
| Tapioca British gum | 97 |
| Borax | 3 |
| Potassium thiocyanate | 15 |
| Water | 110 |

The above materials were mixed together and cooked to a temperature of about 180° F. The mixture was then cooled to 80° F. and applied to paper and dried. The British gum used was one having a solubility of 85% in water at 75° F. and a dextrine content of 36% as determined by the method of Babington, Tingle and Watson, supra.

McLaurin tests on tape prepared with this adhesive composition after air drying averaged about 92.8 when the tape was moistened with water. A higher test was obtained when the tape was moistened with a saturated solution of borax.

Example II

| | Parts |
|---|---|
| Tapioca conversion product | 97 |
| Borax | 3 |
| Potassium thiocyanate | 15 |
| Water | 110 |

The above materials were mixed together and cooked to a temperature of about 180° F. The mixture was then cooled to 80° F. and applied to paper tape and dried. The tapioca conversion product used was one having a dextrine content of 9% as determined by the method of Babington, Tingle and Watson, supra, a solubility of about 12.6% and a fluidity of 38 seconds as determined on a Stormer viscosimeter in the manner previously described.

After being allow to air dry, the McLaurin test on this tape when moistened with water averaged about 87. A higher test was obtained when the tape was moistened with a saturated solution of borax.

The following examples illustrate the use of more than one solvent-plasticizing agent.

Example III

| | Parts |
|---|---|
| Tapioca British gum of Example I | 97 |
| Sodium thiocyanate | 2 |
| Urea | 15 |
| Borax | 3 |
| Glycerine | 2 |
| Water | 110 |

The adhesive was prepared as in Example I and applied to paper tape on a small scale gumming machine adapted to produce results similar to those obtained on large scale machines. The maximum test averaged about 92.3. A higher test was obtained when the tape was moistened with a saturated solution of borax.

Example IV

| | Parts |
|---|---|
| Tapioca conversion product of Example II | 97 |
| Potassium thiocyanate | 2 |
| Borax | 3 |
| Urea | 15 |
| Glycerine | 2 |
| Water | 110 |

The adhesive was prepared as in Example II and applied to paper tape as in Example III. McLaurin tests on this tape averaged about 82. Higher tests were obtained when the tape was moistened with a saturated solution of borax.

It should be understood that the examples of adhesive formulae given above are for the purpose of illustrating the novel character of the invention and for the purpose of making clear the principles and the relative value of the means by which the result is obtained. It is not desired to limit the invention by the specific examples, inasmuch as numerous variations may be made in the character of the adhesive base and in the proportion of other ingredients used without departing from the limits defined as essential for the purpose of the invention.

The starches employed may be derived from root starches, for example, tapioca, sago, cassava, potato, and sweet potato, or from grain starches, for example, corn, rice and wheat. In general, conversion products made from the root starches are preferred and give the best results regardless of whether the conversion product is an incompletely dextrinized product or a British gum. Less desirable results are obtained with starches derived from grains, particularly where the conversion product is a dextrine or an incompletely dextrinized starch rather than a British gum.

Various plasticizing agents, wetting agents, solvents, anti-foam agents and filling materials may be used in conjunction with the preferred adhesive means for the purpose of outlining those special effects for which the use of such materials is known to the adhesive art. Small amounts of sulfonated oils, as, for example, Turkey red oil, in proportions of, say, 0.5% to about 3% may be included in the adhesive compositions of this invention.

In such instances where it is desirable, the disclosed adhesive compositions may be mixed with compatible adhesive materials made from animal glue, fish glue, casein, starch, natural gums and water soluble natural or synthetic resins.

Adhesive compositions made in accordance with the present invention, when applied as a coating and dried and thereafter remoistened, develop extreme tackiness immediately and are characterized by a very high rapidity of set. As contrasted with animal glue adhesives, they have practically no odor. One of the further features of the invention resides in the fact that the preferred adhesives are substantially neutral and contain no ingredients which are harmful to paper or fabric. In addition, adhesive films prepared as we have described, are extremely flexible and do not readily check, crack or chip off from the material to which they are applied.

Adhesive compositions of this type may be used not only as moistening adhesive on gummed tape or other sheet materials, but also in other remoistening adhesive applications, for example, on high speed machines for making containers, receptacles and other articles.

The term "thiocyanate" is employed to cover salts of thiocyanic acid containing the radical —SCN, sometimes called thiocyanides, sulfocyanates, sulfocyanides, rhodanates or rhodanides. See Hackh, Chemical Dictionary, 1929.

Having thus described the invention, what we claim as new and desire to secure by Letters Patent of the United States is:

1. A remoistening adhesive composition formed from a British gum having a dextrine content less than 55%, as determined in the manner herein described, a fluidity within the range of about 15 seconds to about 400 seconds, as determined in the manner herein described, a water solubility at 75° F. within the range of 70% to 95%, intimately dispersed with about 1% to about 5% borax, about 3% to about 30% of an alkali metal thiocyanate, and about 1% to about 10% glycerine, the amount of glycerine being greater than the amount of borax.

2. A remoistening adhesive composition formed from a British gum having a solubility in water at 75° F. of about 60%, a dextrine content less than about 55%, as determined in the manner herein described, and a fluidity within the range of about 15 seconds to about 400 seconds, as determined in the manner herein described, intimately dispersed with a water soluble borate in amounts effective to increase the viscosity but not greater than about 5% by weight of said British gum and about 3% to about 30% of a plasticizer for said adhesive having a modifying action on said borate and comprising a water soluble thiocyanate, said adhesive possessing strong adhesive properties and being capable of forming dried flexible coatings, which, when moistened, develop tackiness and set to a strong bond rapidly.

3. A remoistening adhesive composition formed from a root starch converted to a solubility of 3% to about 50% in water at 75° F., a viscosity within the range of about 15 seconds to about 400 seconds, as determined in the manner herein described, and a dextrine content less than about 55%, as determined in the manner herein described, intimately dispersed with a water soluble borate in amounts less than about 5% and about 3% to about 30% of a plasticizing agent comprising a water soluble thiocyanate, said adhesive possessing strong adhesive properties and being capable of forming dried flexible coatings, which, when moistened, develop tackiness and set to a strong bond rapidly.

4. A remoistening adhesive composition comprising an amylaceous conversion product having a dextrine content less than about 55%, as determined in the manner herein described, and a fluidity within the range of about 15 seconds to about 400 seconds, as determined in the manner herein described, intimately dispersed and associated with a water soluble thiocyanate in amounts from about 3% to about 30% by weight of the amylaceous conversion product, said adhesive possessing strong adhesive properties and being capable of forming dried, flexible coatings, which when moistened develop tackiness and set rapidly.

5. A remoistening adhesive formed from a British gum having a dextrine content less than about 55%, as determined in the manner herein described, a fluidity within the range of about 15 seconds to about 400 seconds, as determined in the manner herein described, and a solubility of at least 60% in water at 75° F., intimately dispersed with a water soluble borate normally having an insolubilizing action on said British gum in effective amounts to increase the viscosity of said adhesive, and a normally solid plasticizer for said adhesive comprising a water soluble thiocyanate and having a solubilizing action on said British gum and a modifying action on said borate in amounts effective in inhibiting the insolubilizing action of said borate on said British gum and in inhibiting retrogradation of said British gum to a less soluble form, said adhesive possessing strong adhesive properties and being capable of forming dried flexible coatings, which, when moistened, develop tackiness and set to a strong bond rapidly.

6. A remoistening composition comprising an amylaceous conversion product having a dextrine content of less than 55%, as determined in the manner herein described, and a fluidity within the range of about 15 seconds to about 400 seconds, as determined in the manner herein described, intimately associated with a viscosity increasing agent in effective amounts to increase the retack properties of said adhesive and a plurality of plasticizing agents effective to inhibit checks and cracks of dried films of said adhesive, one of said plasticizing agents being normally solid and comprising a water soluble thiocyanate in proportitons from about 3% to about 30% by weight of the conversion product, and another being normally liquid and comprising a polyhydric alcohol in proportions from about 1% to about 10% of said conversion product.

7. A remoistening adhesive formed from an incompletely dextrinized root starch conversion product converted to a solubility of about 3% to about 50% in water at 75° F., a viscosity within the range of about 15 seconds to about 400 seconds, as determined in the manner herein described, and a dextrine content less than about 55%, as determined in the manner herein described, intimately dispersed with a water soluble borate normally having an insolubilizing action on said conversion product in effective amounts to increase the viscosity of said adhesive, and a normally solid plasticizer for said adhesive comprising a water soluble thiocyanate having a solubilizing action on said conversion product and a modifying action on said borate in amounts effective in inhibiting the insolubilizing action of said borate on the said conversion product and in inhibiting retrogradation of said conversion product to a less soluble form, said adhesive possessing strong adhesive properties and being capable of forming dried flexible coatings, which, when moistened, develop tackiness and set to a strong bond rapidly.

8. A remoistening adhesive composition comprising an amylaceous conversion product having a dextrine content less than about 55%, as determined in the manner herein described, and a fluidity within the range of about 15 seconds to about 400 seconds, as determined in the manner herein described, intimately dispersed with a water soluble borate and at least one plasticizing agent, comprising a water soluble thiocyanate, adapted to counteract the retrogradation of incompletely degraded portions of the amylaceous base material to a less soluble form, said adhesive possessing strong adhesive properties and being capable of forming dried flexible coatings, which, when moistened, develop tackiness and set to a strong bond rapidly.

9. A remoistening adhesive composition comprising an amylaceous conversion product having a dextrine content less than about 55%, as determined in the manner herein described, and a fluidity within the range of about 15 seconds to about 400 seconds, as determined in the manner herein described, intimately dispersed with a viscosity increasing agent for amylaceous conversion product and at least one plasticizing agent comprising a water soluble thiocyanate adapted to counteract the retrogradation of incompletely degraded portions of the amylaceous base material to a less soluble form, said adhesive possessing strong adhesive properties and being capable of forming dried flexible coatings, which, when moistened, develop tackiness and set to a strong bond rapidly.

10. A remoistening adhesive composition comprising an amylaceous conversion product having a dextrine content less than about 55%, as determined in the manner herein described, and a fluidity within the range of about 15 seconds to about 400 seconds, as determined in the manner herein described, intimately associated with a viscosity increasing agent in effective amounts to increase the retack properties of said adhesive and at least one plasticizing agent comprising a water soluble thiocyanate in effective amounts to inhibit checks and cracks in dried films of said adhesive, said adhesive possessing strong adhesive properties and being capable of forming dried flexible coatings, which, when moistened, develop tackiness and set to a strong bond rapidly.

11. A remoistening adhesive composition comprising an amylaceous base material composed substantially of an incompletely dextrinized starch having a dextrine content less than about 55%, as determined in the manner herein described, a fluidity within the range of about 15 seconds to about 400 seconds, as determined in the manner herein described, and a solubility within the range of about 3% to about 50% in water at 75° F., intimately dispersed with a plasticizing agent comprising a water soluble thiocyanate in amounts effective to counteract the retrogradation of incompletely degraded portions of the amylaceous base material to a less soluble form.

12. A remoistening composition comprising an amylaceous base material consisting substantially of a British gum having a solubility in water of at least 60% at 75° F. and a dextrine content less than about 55%, as determined in the manner herein described, together with a fluidity within the range of about 15 seconds to about 400 seconds, as determined in the manner herein described, intimately associated with a plasticizing agent in amounts effective to counteract the retrogradation of incompletely degraded portions of the amylaceous base material to a less soluble form, and comprising a water soluble thiocyanate.

13. A remoistening adhesive composition comprising an amylaceous conversion product having a dextrine content less than about 55%, as determined in the manner herein described, and a fluidity within the range of about 15 seconds to about 400 seconds, as determined in the manner herein described, intimately dispersed with a plasticizing agent in amounts effective to inhibit the retrogradation of incompletely degraded portions of the amylaceous base material to a less soluble form, said plasticizing agent comprising a water soluble thiocyanate.

HANS F. BAUER.
JORDAN V. BAUER.
DON M. HAWLEY.